(12) United States Patent
Phan-Quiroga et al.

(10) Patent No.: US 10,988,313 B2
(45) Date of Patent: Apr. 27, 2021

(54) FULFILLMENT SYSTEM, ARTICLE AND METHOD OF OPERATING SAME

(71) Applicant: NORDSTROM, INC., Seattle, WA (US)

(72) Inventors: Luong-Ngoc Thai Phan-Quiroga, Seattle, WA (US); Ruchi Patnaik Christensen, Poulsbo, WA (US)

(73) Assignee: NORDSTROM, INC., Seattle, WA (US)

( * ) Notice: Subject to any disclaimer, the term of this patent is extended or adjusted under 35 U.S.C. 154(b) by 113 days.

(21) Appl. No.: 16/379,573

(22) Filed: Apr. 9, 2019

(65) Prior Publication Data
US 2019/0233213 A1 Aug. 1, 2019

Related U.S. Application Data

(63) Continuation-in-part of application No. PCT/US2018/059690, filed on Nov. 7, 2018.
(Continued)

(51) Int. Cl.
*B65G 1/137* (2006.01)
*G06Q 10/08* (2012.01)
(Continued)

(52) U.S. Cl.
CPC ......... *B65G 1/1373* (2013.01); *B65G 1/0492* (2013.01); *B65G 1/06* (2013.01);
(Continued)

(58) Field of Classification Search
CPC combination set(s) only.
See application file for complete search history.

(56) References Cited

U.S. PATENT DOCUMENTS

| 4,527,937 A | * | 7/1985 | Tomasello, Jr. | ......... B65G 1/08 193/35 A |
| 4,542,808 A | * | 9/1985 | Lloyd, Jr. | ............ B65G 1/1376 186/56 |

(Continued)

FOREIGN PATENT DOCUMENTS

| JP | 2005206281 A | 8/2005 |
| WO | 2016/172793 A1 | 11/2016 |
| WO | 2019094511 A1 | 5/2019 |

OTHER PUBLICATIONS

International Search Report for PCT/US2018/059690 dated Jan. 18, 2019, 2 pages.
(Continued)

*Primary Examiner* — Kyle O Logan
(74) *Attorney, Agent, or Firm* — Cozen O'Connor

(57) ABSTRACT

Fulfillment systems may include an item storage and retrieval system which stores and automatically retrieves items, and an order sorting system, downstream from the item storage and retrieval system, which automatically collates retrieved items into orders. A control system controls operation, advantageously allowing operation without any item buffering buffer between the item storage and retrieval system and the order sorting system. Optionally, a destination sortation system may collate orders by intended destinations. The fulfillment system can handle orders for end user consumer as well as for retail locations simultaneously. Robots and/or conveyors may operate to move items between the systems.

27 Claims, 6 Drawing Sheets

Related U.S. Application Data

(60) Provisional application No. 62/582,727, filed on Nov. 7, 2017.

(51) Int. Cl.
*B65G 1/04* (2006.01)
*B65G 1/06* (2006.01)

(52) U.S. Cl.
CPC .......... *B65G 1/1378* (2013.01); *G06Q 10/08* (2013.01); *G06Q 10/087* (2013.01); *B65G 1/0464* (2013.01)

(56) References Cited

U.S. PATENT DOCUMENTS

| | | |
|---|---|---|
| 9,111,251 B1 | 8/2015 | Brazeau |
| 2009/0185884 A1 | 7/2009 | Wurman et al. |
| 2014/0100998 A1* | 4/2014 | Mountz .................. G06Q 10/08 705/28 |
| 2014/0343716 A1* | 11/2014 | Sweet .................... G06Q 10/08 700/217 |
| 2015/0307276 A1 | 10/2015 | Hognaland |
| 2016/0060037 A1 | 3/2016 | Razumov |
| 2017/0101263 A1 | 4/2017 | Schroer |
| 2017/0183158 A1* | 6/2017 | Zhu .......................... B07C 3/02 |
| 2018/0158016 A1* | 6/2018 | Pandya ............ G05B 19/41895 |
| 2019/0310655 A1* | 10/2019 | Voorhies ................. B66F 9/063 |

OTHER PUBLICATIONS

Written Opinion for PCT/US2018/059690 dated Jan. 18, 2019, 3 pages.
International Search Report and Written Opinion for PCT/US2018/059690 dated Aug. 27, 2020, 9 pages.

* cited by examiner

FULFILLMENT SYSTEM, ARTICLE AND METHOD OF OPERATING SAME

TECHNICAL FIELD

The present disclosure generally relates to logistics, and more particularly to fulfillment systems that operate to fulfill or aid in fulfillment of orders for one or more items.

BACKGROUND

Description of the Related Art

Order fulfillment is becoming increasingly important as online sales increase and as "just in time" delivery to retail locations becomes increasing common.

Traditionally, order fulfillment was a wholly or almost wholly manual process. Humans, referred to as pickers, would traverse aisles of a warehouse or fulfillment center, picking items from shelves or bins, for assembling all of the items of a particular order.

More recently, robotic vehicles have been employed to retrieve items from shelves or bins, returning the times to an item buffering buffer where items are retained until all the items needed to fulfill a given order have been assembled. Even more recently a number of automated solutions have been proposed for use in order fulfillment which employ robotic vehicle.

One of these solutions is an automated storage and retrieval (ASRS) system developed by ATTAbotics Inc., of Calgary, Canada, and generally described in International patent application Serial No PCT/CA2016/050484, published as WO 2016/172793 on Nov. 3, 2016. The ASRS includes a three-dimensional array of storage spaces, with racks/rails that extend across a top of the array and down a number of shafts through the array over which robotic vehicles can operate to automatically store and retrieve items from the storage spaces, and deliver the retrieved items to one or more output stations. Humans working at the output stations can assemble orders from retrieved items, for example packing one or more items for to fulfil an order. The ASRS system has its own dedicated control system and is designed and built as a standalone system.

Another one of these solutions is a parcel and article sorting system (e.g., t-Sort system) developed and sold by Tompkins International, Inc. of Raleigh, N.C. and described in U.S. Ser. No. 15/455,094, published as US 2017/0183158 on Jun. 29, 2017. The t-Sort system has its own dedicated control system and is designed and built as a standalone system.

The automated storage and retrieval (ASRS) system by ATTAbotics Inc. and the t-Sort system Tompkins International, Inc. are conventionally considered competing alternatives to one another.

Traditional warehouse, fulfillment and distribution workflows batches or aggregates like product together for efficient picking, and to maximize the utilization of a unit sortation system. To achieve this, as customer or store orders are released to the warehouse for picking, there exists systems logic to batch like product together, release the like product to a physical buffer, and wait until all orders associated to that batch of orders is fully picked to completion, before releasing to the next operation for unit sortation. For example, use of the automated storage and retrieval (ASRS) system by ATTAbotics Inc. and the t-Sort system Tompkins International, Inc. each typically involved performing buffer sequencing to group/organize product upfront, and which is conventionally needed for store or customer orders. Further, these systems are typically dedicated to servicing orders for either retail locations or for end customers.

BRIEF SUMMARY

A fulfillment system may include an item storage and retrieval system, an order sorting system or order sortation system, an optional destination sortation system, and a controller that controls operation of the item storage and retrieval system, the order sorting or sortation system, and optionally the destination sortation system to improve efficiency in order fulfillment operations. In some implementations, the item storage and retrieval system may be similar, or even identical, to the ASRS system developed by ATTAbotics, Inc. In some implementations, the order sorting or sortation system and the optional destination sortation system may be similar, or even identical, to the t-Sort from Tompkins International, Inc. The control system is communicatively coupled to advantageously control operation of the item storage and retrieval system, the order sorting or sortation system, and/or optionally the destination sortation system, to enhance operational efficiency.

The combination of the item storage and retrieval system, the order sorting or sortation system, and/or the optional destination sortation system can advantageously fit in a wide variety of spaces, e.g., retail store space, or fulfillment/distribution/warehouse facility. The resulting system does not have to be installed in traditional warehouse facilities with certain clear height minimums. The combination of the item storage and retrieval system, the order sorting or sortation system, the optional destination sortation system, when operated in conjunction with one another for instance via a control system, can to some extent be considered a "turn-key" solution, enabling both store and e-commerce fulfillment solutions.

Combining a storage and retrieval system to store inventory (items/products), retrieve and deliver the items/products to an order sortation system to aggregate multi-unit customer or store orders, for packing, then delivering the packaged (e.g., box/bag) with customer or store orders to a destination sortation system for shipping, including for example last mile zip-code sortation, provides a next generation, turn-key solution, for concurrently fulfilling customer and retail store orders.

Use of a control system to co-operate the storage and retrieval system and the order sortation system may enable continuous product flow for the aggregation of multi-units customer or store orders, advantageously allowing the elimination of a physical buffer and logical buffer sequence. For example, a control system can control operation of the storage and retrieval system to ensure that a retrieval rate does not exceed a handling capacity or sortation rate of one or more order sortation systems. Also, for example, a control system can control operation of the order sortation system to ensure that a handling capacity or sortation rate does not exceed a retrieval rate of one or more storage and retrieval systems. In at least some implementations, the control system may synchronize or match the retrieval rate with the sortation rate.

The systems and methods described herein may advantageously eliminate the need to batch/aggregate like product, either by like product type, or customer type, or store type (aka 'buffer sequencing'), and to just flow each product/item of the customer or store orders as they flow to the warehouse for picking and unit sortation. By directly routing items from an item storage and retrieval system to an order sorting or sortation system for collation/packing/shipping, the need to sequence orders upfront may be greatly reduced or even eliminated. This reduction in sequencing may result in significantly reducing or even eliminating the wait times associated with product aggregation. Co-operating an item storage and retrieval system and an item sorting or sortation system advantageously allows items may be immediately diverted to an appropriate final collation or destination station for collation as orders and packing, each destined for a retail location (e.g., store) or for delivery to an end customer (e.g., customer home address, work address, post office box, locker). As a result, there is no intermediate operations related to determining which sequence items should be retrieved and sorted in the process of retrieving the correct items and sorting those items for packing and/or shipping.

Removing the logical and physical buffer minimizes cost for investment (e.g., costs associated with a physical buffer). Removing the logical and physical buffer, it reduces the wait times associated with the logical buffer (e.g., time required for the storage and retrieval system to calculate which product, customer type, or store type should be batched together to increase pick efficiencies and unit sorter efficiencies.

Removing the logical and physical buffer also allows priority orders (e.g., new orders) to be injected into the workflow of the item storage and retrieval system at any time for picking, ahead of prior orders that have already been downloaded, 'batched' for picking, and otherwise sequenced to flow first in/first out (FIFO). Thus, the approaches described herein literally allows priority orders to 'cut the line' for priority fulfillment over existing orders, enhancing flexibility in fulfillment.

In a simplified implementation, only one criteria is considered. The control system (also denominated herein as R-server or robotic server) uses a total number of open chutes (store or e-com destinations) available (open or not open) in the order sortation system (e.g., Tompkins t-Sort system) to determine how to adjust operation. For example, the order sortation system (e.g., Tompkins t-Sort system) sends a message in near real-time to the control system (e.g., R-server) to indicate how many open chutes are currently available. Based on the total number of open chutes currently available, the control system (e.g., R-server) will send a number of pick requests for items to the item storage and retrieval system (e.g., ATTAbotics ASRS system). The above repeats to achieve a desired continuous pick to sorter order flow (e.g., retrieval rate approximately matches sortation rate).

A most simplified implementation may rely on human pickers to move items from output stations of the item storage and retrieval system to input stations of the sortation system. Alternatively or additionally, one or more conveyors may be included to move item from the output stations of the item storage and retrieval system to input stations of the sortation system. Alternatively or additionally, one or more robots (e.g., robotic vehicles, robots with robotic appendages with end effectors or end of arm tools, or combined robotic vehicles with robotic appendages) may be included to move item from the output stations of the item storage and retrieval system to input stations of the sortation system.

In the simplified implementation, if the pickers (e.g., humans, conveyors, robots) pick at a slower rate than a sort rate available on the order sortation system (e.g., Tompkins t-Sort system), additional assistance (e.g., humans, conveyors, robots) may be added to the pick stations and/or additional pick stations added. Conversely, if picking is outpacing the open chutes available for sortation at the order sortation system, additional sorters (e.g., humans, conveyors, robots) may be added at the order sortation system (e.g., Tompkins t-Sort system) to clear items/products from, for example, totes and increase the number of available chutes.

In a more sophisticated implementation, the control system (e.g., R-server) employs a 'throttling logic', that will calculate the rate of picking against total number of open chutes of the order sortation system to ensure continuous product flow occurs across the item storage and retrieval system (e.g., ATTAbotics ASRS system) and the order sortation system (Tompkins t-Sort system).

The throttling logic is automated, and may, for example, use one, more or all of: i) a total number of available pick stations (e.g., output stations of the item storage and retrieval system), which is typically a constant value based on the site/location; ii) a mechanical rate (e.g., retrieval rate) to deliver items (e.g., bins with items, totes with items) from the item storage and retrieval system (e.g., ATTAbotics ASRS system); iii) a total number of available chutes (e.g., collation stations) at the order sortation system, which is typically a constant value based on the site/location for e-com destinations or store destinations (which are typically processed separately from one another); iv) a mechanical rate (e.g., sortation rate) to induct the items/products from the pick stations (e.g., output stations of the item storage and retrieval system (e.g., ATTAbotics ASRS system)) into the order sortation system (e.g., Tompkins International t-Sort system) and to transport the items/produces (via robotic vehicles) to an open/available chute in the order sortation system, including diverting the item/product to the open or available chute.

In response to the picking or rate of retrieval falling behind the sortation or rate of sortation by the order sortation system, the control system (e.g., R-server) increases the retrieval rate of the item storage and retrieval system thereby increasing a number of items/totes/bins delivered to the pick stations per unit time, including optionally directing more items/totes/bins to other pick stations, up to a maximum total number of pick stations. In some implementations, the control system may cause a second, or third or additional instance of an item storage and retrieval system to become operational in order to increase the retrieval rate. In response to the sorting or sortation rate falling behind the picking or rate of retrieval, the control system (e.g., R-server) slows down the picking or retrieval rate at which the item storage and retrieval system delivers the items/totes/bins to the pick or output stations. In some implementations, the control system synchronizes operation between the item storage and retrieval system and the order sortation system, even in some instances attempting to at least approximately match the retrieval rate with the sortation rate.

The most simplified implementations may employ humans to pick items/totes/bins from the output stations of the item storage and retrieval system and to induct the items/totes/bins into the order sortation system. More sophisticated implementations may use one or more robots (e.g., robotic appendage with end effector, robotic vehicle, or a combination of both) to pick items/totes/bins from the output stations of the item storage and retrieval system and to induct the items/totes/bins into the order sortation system. Such embodiments will employ the time it takes to transfer items/totes/bins between the systems as part of determining the sortation rate, which will likely may the sortation rate more consistent over time and between pick or output stations.

In any of the implementations, one or more conveyors (e.g., driven conveyor belts, passive/gravity feed conveyor roller tracks) can be employed to move items/totes/bins from the item storage and retrieval system to the order sortation system and/or to a destination sortation system.

In a more sophisticated implementation, robotic vehicles may be employed to move items/totes/bins from the item storage and retrieval system to the order sortation system and/or to a destination sortation system. In an even more sophisticated implementation, robotic vehicles may be employed to both retrieve items/totes/bins from the item storage and retrieval system and to move the retrieved items/totes/bins to the open chutes or open order collation positions of the order sortation system. In at least some implementations, the same robotic vehicle that retrieves an item/tote/bin from storage locations of the item storage and retrieval system may transport the retrieved item/tote/bin all the way to the selected open chute or open order collation position of the order sortation system.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn, are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with logistics systems, package handling, fulfillment and robotics have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," "one implementation," "an embodiment," or "an implementation" means that a particular feature, structure or characteristic described in connection with the embodiment or implementation is included in at least one embodiment or one implementation. Thus, the appearances of the phrases "in one embodiment," "in one implementation," "in an embodiment," "or "in one implementation" in various places throughout this specification are not necessarily all referring to the same embodiment or to the same implementation. Furthermore, the particular features, structures, or characteristics may be combined in any suitable manner in one or more embodiments or implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The order sorting system or order sortation system may also be referred to as an order collating system or order collation system, as items that comprise the order may be collated together to form the order. The destination sortation system may also be referred to as a parcel sorting system or parcel sortation system, as sets of packaged orders may be collated together based on a destination (e.g., retail store location, end customer location, postal code, for instance Zip code).

As used in this specification and the appended claims, the terms tote(s), bin(s), and container(s) are used interchangeably.

The headings and Abstract of the Disclosure provided herein are for convenience only and do not interpret the scope or meaning of the embodiments.

Figure 1:
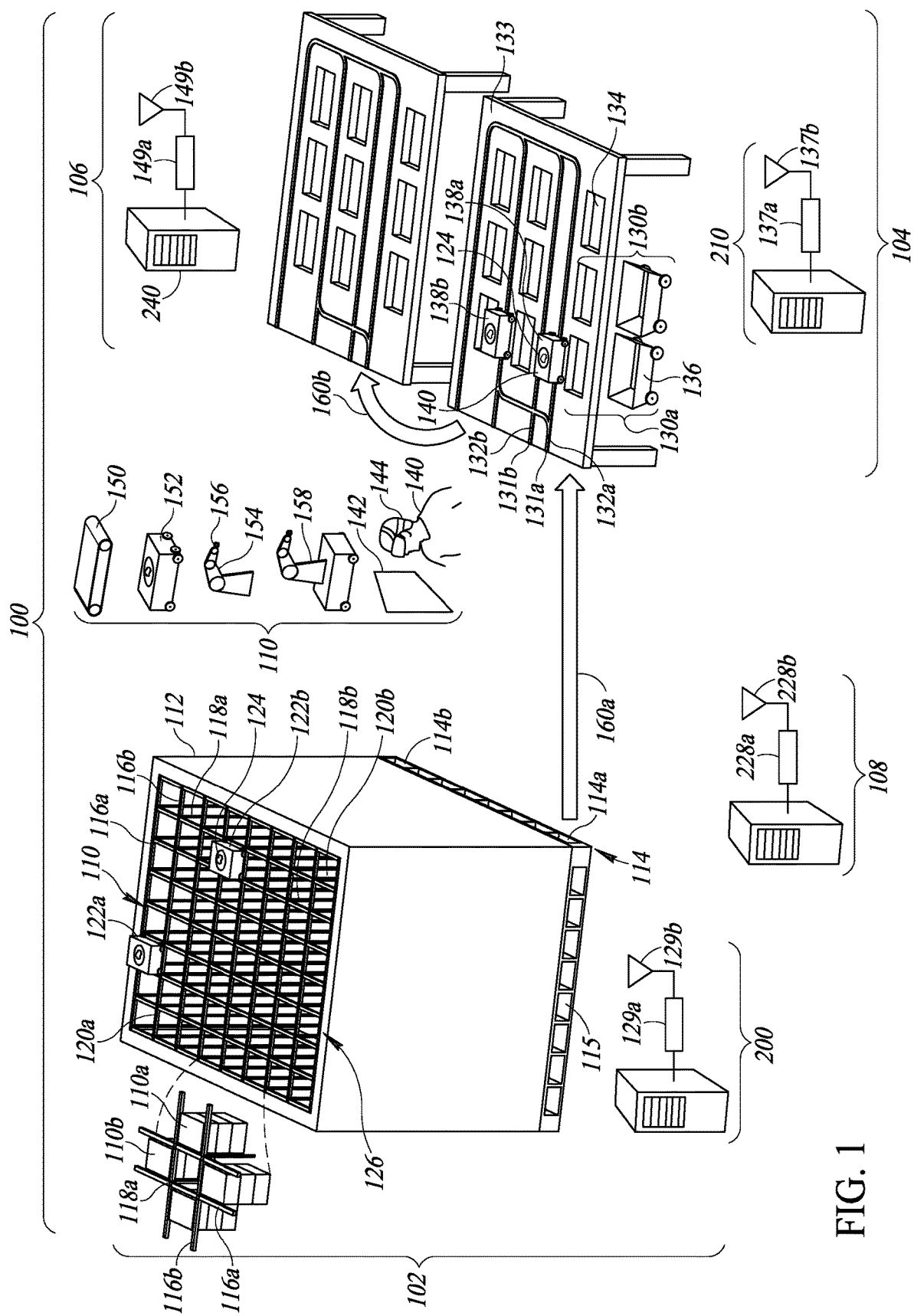
FIG. 1 is a schematic diagram of a fulfillment system according to at least one illustrated implementation, the fulfillment system including an item and storage retrieval system with respective robots, an order sortation system with respective robots, an optional destination sortation system, and a control system operable to control operation of at least one of the item storage and retrieval system and the order sortation system to advantageously eliminate any need for any physical item buffering buffer.

FIG. 1 shows a fulfillment system 100 according to at least one illustrated embodiment.

The fulfillment system 100 includes an item and storage retrieval system 102, an order sortation system 104, optionally a destination sortation system 106, and a control system 108 operable to control operation of at least one of the item storage and retrieval system 102 and the order sortation system to eliminate a need for any physical item buffering buffer. The order sortation system 104 may be positioned relatively downstream from the item and storage retrieval system 102 in a fulfillment flow, while the destination sortation system 106 may be positioned relatively downstream from the order sortation system 104 in the fulfillment flow. As described in detail below, the item and storage retrieval system 102 stores various items and retrieves items as desired to fulfill orders for items. As described in detail below, the order sortation system collates one or more retrieved items by, and into, orders. Order sortation or collation may occur as part of packaging or loading into totes, or may occur at or at least proximate a packing location or station. Orders may, for example, be placed by and/or destined for delivery to end consumers and/or retail locations. Each order may include one or more items. Where an order includes two or more items, those items may be multiple instances a same respective type of item or SKU, and/or may include two or more different types or items or SKUs. Orders may include items actually ordered by an end customer or retail location. In some instances, an order may include additional items, in addition to items actually ordered by an end customer. For example, some items may be offered or provided as a kit or promotional kit. For instance, any orders for a full size product at full retail price may be accompanied by a complimentary sized item of a complementary product, or may be accompanied by a second instance of the full size product (i.e., a "twofer"). Such combining of products may be denominated as kitting since a plurality of items are combined as a package or kit. Such combining may be limited to orders received during a promotional period.

As described in detail below, the optional destination sortation system organizes orders by delivery destination, for instance by postal code (e.g., ZIP code) and/or by retail location. Some implementations omit destination sortation systems, either not sorting by destination or implementing the destination sort via the order sortation system. As described in detail below, the control system 108 is operable to control at least one of the item storage and retrieval system 102 and/or the order sortation system 104.

The fulfillment system 100 may be located at any one or more of a variety of locations in a supply chain. For example, a fulfillment system 100 may be located at a fulfillment center or warehouse, downstream of manufacturers and upstream of retail locations and end customers. Such a fulfillment system 100 may be operated to collate and provide orders to retail locations and/or end customers. Additionally or alternatively, a fulfillment system 100 may be located at a manufacturing location or factory, upstream from a fulfillment center, retail locations and end customers. Such a fulfillment system 100 may be operated to collate and provide orders to fulfillment centers or warehouses. Additionally or alternatively, a fulfillment system 100 may be located at one or more retail locations, downstream of manufacturing locations or factories, and fulfillment centers, and upstream from end customers. Such a fulfillment system 100 may be operated to collate and provide orders to retail shelves, delivery vehicles, and/or for pickup by end customers.

The item and storage retrieval system 102 may take any of a variety of forms that allow temporary storage of items, and retrieval of selected items on demand. In at least one implementation, the item and storage retrieval system 102 includes a three-dimensional array of storage locations, compartments, or spaces 110a, 110b (only two called out, collectively 110), which may be supported by a frame 112. The item and storage retrieval system 102 may also include a number of output stations 114a, 114b (only two called out, collectively 114). A total number of the output stations 114 in operation at any given time may, in at least some implementations, be variable. The item and storage retrieval system 102 may also include a number of input stations 115 (only one called out). The frame 112 may provide a number of horizontally extending rails or racks 116, 116b (only two called out, collectively 116) and a number of vertically extending rails or racks 118a, 118b (only two called out, collectively 118) which form shafts 120 (only one called out). At least the vertically extending rails or racks 118a, 118b may be toothed, having a plurality of teeth to allow controlled upward and downward translation therealong. The total number of shafts 120 are locations of the shafts 120 are arranged to collectively provide access to all of the storage locations, compartments, or spaces 110a, 110b. The item and storage retrieval system 102 may include a number of robotic vehicles 122a, 122b (only two called out, collectively 122) operable to traverse horizontally and vertically via the rails or racks 116, 118, for instance via wheels or pinion gears to access the various storage locations, compartments, or spaces 110a, 110b to retrieve items 124 (only one called out) and to transport the retrieved items 124 to the one or more output stations 114a, 114b. The robotic vehicles 122a, 122b of the item and storage retrieval system 102 may traverse horizontally on an upper surface 126 (e.g., top grid), along X and Y axes and/or traverse horizontally on a lower surface (e.g., bottom grid), along X and Y axes. The robotic vehicles 122a, 122b of the item and storage retrieval system 102 may traverse vertically along (e.g., through) shafts 120 between columns of storage locations, compartments, or spaces, along Z axes. The robotic vehicles 122a, 122b may have a table or turret 128 (FIG. 2A, only one called out) to carry items, or totes containing items, with or without fences. The tables or turrets 128 may be rotatable about an axis (e.g., a vertical axis), and tilt-able or pivotable about an axis (e.g., a horizontal axis), to allow items to be oriented and slid or rolled off the robotic vehicle 122a, 122b, for example once the robotic vehicle 122a, 122b reaches a destination (e.g., output station 114a, 114b).

Figure 2A:
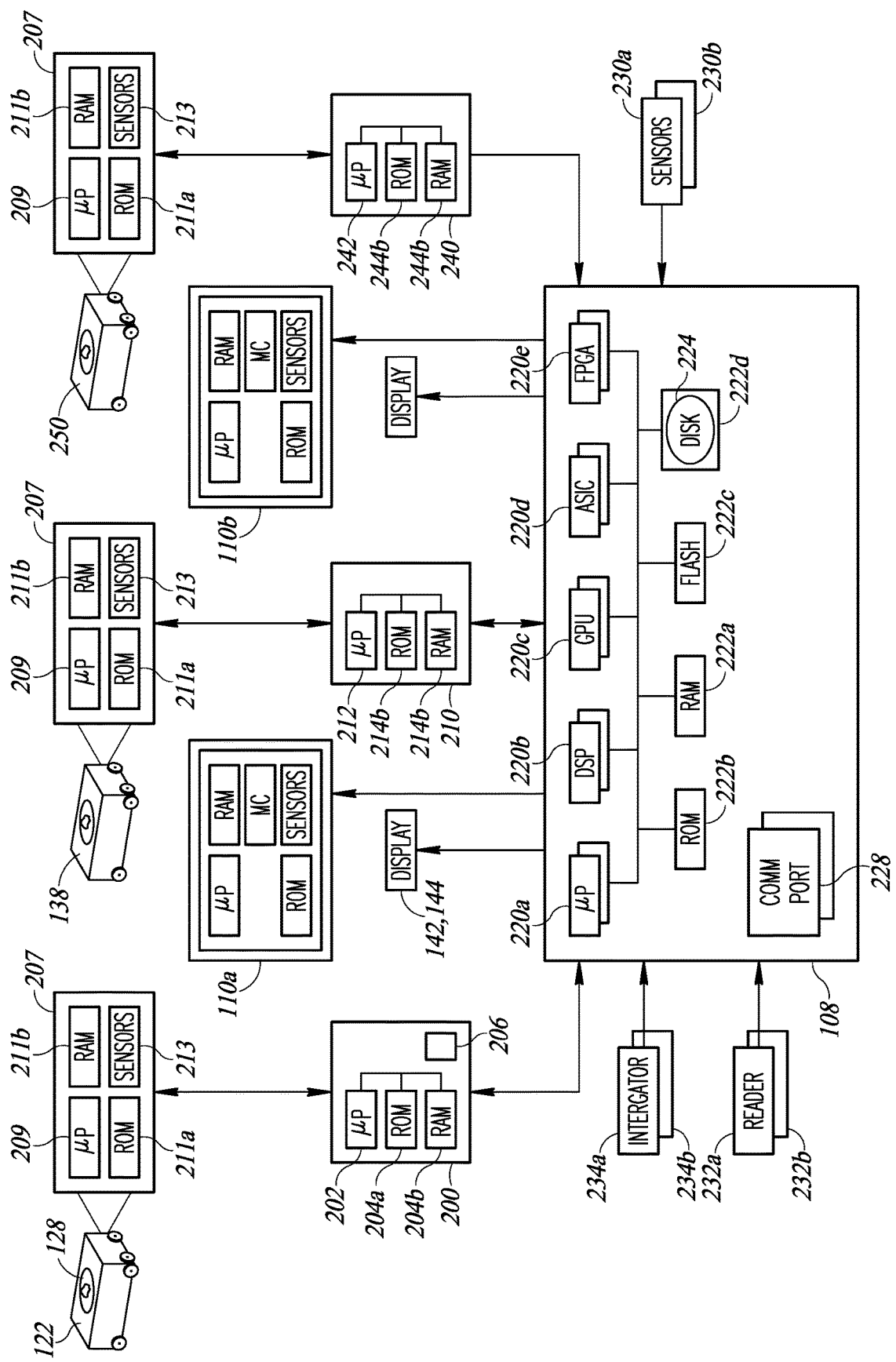
FIG. 2A is a block diagram of the control system of FIG. 1 according to at least one illustrated implementation, the control system communicatively coupled to respective dedicated control systems of the item storage retrieval system, the order sortation system, and optionally the destination sortation system to control operation of the same and advantageously eliminate any need for any physical item buffering buffer.

As best illustrated in FIG. 2A, the item and storage retrieval system 102 may have a dedicated control system 200 including one or more processors 202 (only one illustrated) and nontransitory processor readable media 204a, 204b (only two illustrated) that stores processor-executable instructions 206 which, when executed by the at least one processor 202 controls operation of the item and storage retrieval system 102. The robotic vehicles 122 may have control systems 207 including one or more processors 209 (only one illustrated) and nontransitory processor readable media 211a, 211b (only two illustrated) that stores processor-executable instructions which, when executed by the at least one processor 209 controls operation of the robotic vehicles 122. The control systems 207 may include, or be communicatively coupled to one or more sensors 213 (e.g., digital cameras, GPS receiver, contact sensors, motion sensors, proximity sensors, LIDAR) carried by the robotic vehicles 122.

Returning to FIG. 1, the control system 200 of the item and storage retrieval system 102 may control the robotic vehicles 122a, 122b (FIG. 1) of the item and storage retrieval system 102 to move to selected storage locations, compartments, or spaces 110a, 110b (FIG. 1) to retrieve the items 124 temporarily stored there, and to transport the retrieved items 124 to identified ones of the output stations 114a, 114b (FIG. 1). The control system 200 of the item and storage retrieval system 102 may also control the robotic vehicles 114a, 114b of the item and storage retrieval system 102 to move to selected input stations 115 to collect items 124 and transport the items to selected storage locations, compartments, or spaces 110 to replenish the storage locations, compartments, or spaces 110. The control system 200 of the item and storage retrieval system 102 may include one or more communications channels, for example via one or more wired or wireless communications ports, for instance one or more radios 129a and antenna 129b to provide communications with the robotic vehicles 114a, 114b.

The item storage and retrieval system 102 may be operable at one or more retrieval rates, which may be adjustable. The retrieval rate may represent an average, median or maximum rate at which items may be retrieved from storage locations, compartments, or spaces 110 and transported to an output station 114a, 114b. For instance, the retrieval rate may represent the average number of retrievals per unit of times across all permutations of storage locations, compartments, or spaces 110 and output stations 114. It is noted that it may take longer to retrieve items 124 from certain storage locations, compartments or spaces 110 than others, and may take longer to transport items 124 to certain output stations 114 than others, thus there can be large differences in time to retrieve and transport an item 124 depending on the particular storage location, compartment or space 110 of the item 124 and the particular output station 114. Alternatively, the retrieval rate may represent a "worse case" scenario, reflecting the slowest rate (items per unit of time) using a most distant storage location, compartment or space 110 and a most distant output station 114. Additionally, representations in formats other than items per unit time may be employed. In at least some implementations the retrieval rate may be adjusted by adjusting one or more operational characteristics of the storage and retrieval system 102, for example adjusting the total number of output stations 114, the total number of robotic vehicles 122 available for retrieving items 124, a speed of the robotic vehicles 122, and/or motion planning for the robotic vehicles 122 for instance to reduce wait times used to avoid potential collisions between robotic vehicles 122. Thus, a current or future retrieval rate of the storage and retrieval system 102 may be selectively adjusted.

In some implementations, the item and storage retrieval system 102 may be a standalone system manufactured by a first manufacturer. For instance, the item and storage retrieval system 102 may similar, or even identical to that describe in PCT/CA2016/050484, published as WO 2016/172793 on Nov. 3, 2016 in the name of ATTAbotics Inc., of Calgary, Canada.

The order sortation system 104 may take any of a variety of forms that allows retrieved items to be collated into sets corresponding to orders. In at least some implementations, the order sortation system 104 includes a plurality of collation stations 130a, 130b (two called out collectively 130) at which items are delivered and grouped into sets or orders. In at least some implementations, the order sortation system 104 includes a number of input stations 131a, 131b (two called out, collectively 131). In at least some implementations, the order sortation system 104 includes a number of paths 132a, 132b (two called out, collectively 132) that lead to the collation stations 130 from the input stations 131. The path(s) 132 may be raised or elevated on a platform 133, and each collation station 130 may have an associated opening or ledge 134 (only one called out), below which packaging, a tote, or container 136 (only one called out) may be positioned, or even docked. In at least some implementations, the order sortation system 104 includes a respective set of robotic vehicles 138a, 138b (two called out, collectively 138), which traverse the various paths 132 to deposit retrieved items 124 into the packaging, totes, or containers 136 at the various collation stations 130. The robotic vehicles 138 may, for example, each have a table 140 (only one called out) at an upper surface, which can be controllably tilted to deposit the retrieved items 124 into the packaging, totes, or containers 136.

As best illustrated in FIG. 2A, the order sortation system 104 may have a dedicated control system 210 including one or more processors 212 (only one illustrated) and nontransitory processor readable media 214a, 214b (only two illustrated) that stores processor-executable instructions 216 which, when executed by the at least one processor 212 controls operation of the order sortation system 104. The robotic vehicles 138 may have control systems 207 including one or more processors 209 (only one illustrated) and nontransitory processor readable media 211a, 211b (only two illustrated) that stores processor-executable instructions which, when executed by the at least one processor 209 controls operation of the robotic vehicles 128. The control systems 207 may include, or be communicatively coupled to one or more sensors 213 (e.g., digital cameras, GPS receiver, contact sensors, motion sensors, proximity sensors, LIDAR) carried by the robotic vehicles 128.

The control system 210 of the order sortation system 104 may control the robotic vehicles 138 of the order sortation system 104 to move to selected input positions or stations 131 to collect the retrieved items 124, and to transport the retrieved items 124 to identified ones of the collation stations 130 and deposit the items at the identified collation stations 130. The control system 210 of the order sortation system 104 may include one or more communications channels, for example via one or more wired or wireless communications ports, for instance one or more radios 137a and antenna 137b to provide communications with the robotic vehicles 114a, 114b.

The order sortation system 104 may be operable at one or more sortation rates, which may be adjustable. The sortation rate may represent an average, median or maximum rate at which items may be transported to and deposited at collation stations 130 from an input station 131. For instance, the sortation rate may represent the average number of collations per unit of times across all permutations of input stations 131 and collation stations 130. It is noted that it may take longer to transport and deposit items to certain collation stations 130 than others, and may take longer to pick up items from to certain input stations 131 than others, thus there can be large differences in time to sort or collate items depending on the particular collation station 130 and the particular input station 131. Alternatively, the sortation rate may represent a "worse case" scenario, reflecting the slowest rate (items per unit of time) using a most distant collation station 130 and a most distant input station 131. Additionally, representations in formats other than items per unit time may be employed. In at least some implementations the sortation rate may be adjusted by adjusting one or more operational characteristics of the sortation system 104, for example adjusting the total number of collation stations 130, the total number of robotic vehicles 138 available for transporting items, a speed of the robotic vehicles 138, and/or motion planning for the robotic vehicles 138, for instance to reduce wait times used to avoid potential collisions between robotic vehicles 138. Thus, a current or future sortation rate of the sortation system 104 may be selectively adjusted.

In some implementations, the order sortation system 104 may be a standalone system manufactured by a second manufacturer, different from the first manufacturer. For instance, the order sortation system 104 may be similar, or even identical to, the system available under the name t-Sort from Tompkins International, Inc. of Raleigh, N.C. and/or the parcel and article sorting system and method described in U.S. Ser. No. 15/455,094, published as US 2017/0183158 on Jun. 29, 2017 in the name of Tompkins International, Inc. of Raleigh, N.C.

The destination sortation system 106 may take any of a variety of forms that allows orders to be collated into sets corresponding to respective destinations. The destinations may be identified by any one or more of a variety of specifiers, for instance postal codes (e.g., ZIP codes), retail locations, etc. In at least some implementations, the destination sortation system 106 may be similar, or even identical, in structure to the order sortation system 104, however operates at level of collating multiple orders based on destination, where there are multiple orders for a given destination.

As best illustrated in FIG. 2A, the destination sortation system 106 may have a dedicated control system 240 including one or more processors 242 (only one illustrated) and nontransitory processor readable media 244a, 244b (only two illustrated) that stores processor-executable instructions which, when executed by the at least one processor 242 controls operation of the destination sortation system 106. Robotic vehicles 250 may have control systems 207 including one or more processors 209 (only one illustrated) and nontransitory processor readable media 211a, 211b (only two illustrated) that stores processor-executable instructions which, when executed by the at least one processor 209 controls operation of the robotic vehicles 250. The control systems 207 may include, or be communicatively coupled to one or more sensors 213 (e.g., digital cameras, GPS receiver, contact sensors, motion sensors, proximity sensors, LIDAR) carried by the robotic vehicles 250.

Returning to FIG. 1, the control system 240 of destination sortation system 106 may include one or more communications channels, for example via one or more wired or wireless communications ports, for instance one or more radios 149a and antenna 149b to provide communications with one or more robotic vehicles 250 (FIG. 2A).

The fulfillment system 100 optionally includes one or more transfer mechanisms 110, for example one or more transfer mechanisms 110a (FIG. 2A) operable to transfer retrieved items from the item storage and retrieval system 102 to the order sortation system 104, and optionally one or more transfer mechanisms 110b (FIG. 2A) operable to transfer retrieved items from the order sortation system 104 to the destination sortation system 106. The transfer mechanisms 110 may take any of one or more of a large variety of forms operable to transfer retrieved items. In at least one implementation, the transfer mechanism 110 may be manual, implemented by one or more persons 140 (only one illustrated), who may be prompted via a display screen 142 (only one illustrated), wearable heads up display 144 (only one illustrated) or projector 146 (only one illustrated), which may in some implementations be at least partially controlled via the control system 108. In at least one implementation, the transfer mechanism 110 may be automated, implemented by one or more conveyors 150 (only one illustrated, e.g. driven belt conveyors, gravity roller conveyors), which may in some implementations be at least partially controlled via the control system 108. In at least one implementation, the transfer mechanism 110 may be automated, implemented by one or more robotic vehicles 152 (e.g., vehicles without human drivers or operators, and typically with wheels, treads, motor(s) and drive train), which may in some implementations be at least partially controlled via the control system 108. In at least some implementations, these robotic vehicles 152 are separate and distinct from the robotic vehicles 122 of the storage and retrieval system 102 and/or separate from the robotic vehicles 138 of the sortation system 104. In at least one implementation, the transfer mechanism 110 may be automated, implemented by one or more robots having one or more robotic appendages 154 (only one illustrated) with end effectors or end of arm tools 156, which may in some implementations be at least partially controlled via the control system 108. In at least one implementation, the transfer mechanism 110 may be automated, implemented by one or more robotic vehicles (e.g. vehicles without human drivers or operators, and typically with wheels, treads, motor(s) and drive train) having one or more robotic appendages with end effectors or end of arm tools 158 (only one illustrated), which may in some implementations be at least partially controlled via the control system 108. Notably, the fulfillment system 100 advantageously eliminates all physical item buffering buffers between the item storage and retrieval system 102 and/or the order sortation system 104.

A general work flow or flow of items 124 is illustrated via arrows 160a, 160b (FIG. 1).

In at least some implementations, the fulfillment system 100 may advantageously handle returns (e.g., items returned by an end customer; items returned by a retail location). A returned item may be received and inspected. Inspection may be manually performed by a human, and/or may employ automated processes for instance machine-vision inspection. If the item passes inspection (e.g., not soiled not torn or worn or discolored, matches expected item, for instance comparing information read from a hang tag, machine-readable symbol or wireless transponder to order information and/or to information discerned from image recognition), the returned item may be placed into one of the storage locations, compartments, or spaces 110 of the item storage and retrieval system 102, for example by robotic vehicles 122. In at least some implementations, returned items may be received via a sortation system, which may a dedicated to handling return items, or may be bi-directional or operable to sort items into orders as well as sorting returned items for possible use in fulfilling future orders or for distribution to a "factory outlet" or similar discounted retail location.

At least some of the transfer mechanisms 110 (e.g., conveyors 150, robotic vehicles 152, robots with robotic appendages 154, robotic vehicles with robotic appendages 158, displays 142 or wearable heads up displays 144) may have respective control systems 207 including one or more processors 209 (only one illustrated) and nontransitory processor readable media 211a, 211b (only two illustrated) that stores processor-executable instructions which, when executed by the at least one processor 209 controls operation of the respective transfer mechanisms 110. The control systems 207 may include, or be communicatively coupled to one or more sensors 213 (e.g., digital cameras, GPS receiver, contact sensors, motion sensors, proximity sensors, LIDAR) carried by the respective transfer mechanism 110.

As best illustrated in FIG. 2A, the control system 108 may include one or more processors 220a-220e (collectively 220), one or more nontransitory processor-readable media 222a-222e (collectively 222) that stores processor executable instructions which, when executed by the at least one processor 220 cause the at least one processor 220 to perform many or all of the operations described herein. The at least one processor 220 comprises circuitry, typically integrated circuits, and may include one or more of: one or more micro-controllers, one or more microprocessors 220a with one or more cores, one or more central processing units (CPUs), one or more digital signal processors (DSPs) 220b, one or more graphics processing units (GPUs) 220c, one or more application specific integrated circuits (ASICs) 220d, one or more field programmable gate arrays FPGAs) 220e, and/or one or more programmable logic units (PLUs), or other logic circuits. The one or more nontransitory processor-readable media 222 may include one or more volatile memories (e.g., random access memory (RAM) 222a), one or more non-volatile memories (e.g., read only memory (ROM) 222b, Flash memory 222c, EEPROM), and/or disk based media (e.g., magnetic disks, optical disks) 222d and associated drive 224. The various components may be communicatively coupled via one or more communications channels or buses (e.g., power bus, instructions bus, PCIe bus) 226.

The control system 108 may include communications ports 228 to provide communications with external components and systems, for example with the item storage and retrieval system 102 and with the order sortation system 104. The communications ports 228 may be wired and/or wireless, and may include conventional physical interfaces and logical interfaces, including suitable drivers. In at least some implementations, the communications ports 228 may include one or more wireless transmitters, receivers, transceivers, collectively referred to as radios 228a (FIG. 1), and associated antenna 228b (FIG. 1).

The control system 108 may include, or may be coupled to, one or more sensors 230a, 230b (collectively 230). The sensors 230 may take any one or more of a large variety of forms. For example, a first number of sensors 230a may be positioned to sense a current sortation rate of the order sortation system 104, the sensors 230a communicatively coupled to provide an indication of the current sortation rate to the control system 108. Also for example, a second number of sensors 230b may be positioned to sense a current retrieval rate of the item storage and retrieval system 102, the sensors 230b communicatively coupled to provide an indication of the current retrieval rate to the control system 108. The sensors 230 may include any one or more of: one or more digital cameras, one or more motions sensors, one or more proximity sensors, one or more positional encoders, one or more rotary encoders, one or more Reed switches.

The control system 108 may include, or may be coupled to, one or more readers 232a, 232b (collectively 232). The readers 232 may take any one or more of a large variety of forms, typically machine-readable symbol readers operable to read information encoded in machine-readable symbols (e.g., on-dimensional or barcode symbols, two-dimensional or area or matrix code symbols). For example, a first number of readers 232a may be positioned to read symbols associated with items, positions, compartments, totes, bins or vehicles going into or out of the item storage and retrieval system 102, the readers 232a communicatively coupled to provide an indication of an identity of items, positions, compartments, totes, bins or vehicles to the control system 108. Also for example, a second number of readers 232b may be positioned to read symbols associated with items, positions, compartments, totes, bins or vehicles going into or out of the order sortation system 104, the readers 232b communicatively coupled to provide an indication of an identity of the items, positions, compartments, totes, bins or vehicles going into or out of the order sortation system 104 to the control system 108.

The control system 108 may include, or may be coupled to, one or more interrogators 234a, 234b (collectively 234). The interrogators 234 may take any one or more of a large variety of forms, typically radio frequency identification (RFID) interrogators operable to read information encoded in RFID transponders or tags. For example, a first number of interrogators 234a may be positioned to read information from RFID transponders associated with items, positions, compartments, totes, bins or vehicles going into or out of the item storage and retrieval system 102, the interrogators 234a communicatively coupled to provide an indication of an identity of items, positions, compartments, totes, bins or vehicles to the control system 108. Also for example, a second number of interrogators 234b may be positioned to read information from RFID transponders associated with items, positions, compartments, totes, bins or vehicles going into or out of the order sortation system 104, the interrogators 234b communicatively coupled to provide an indication of an identity of the items, positions, compartments, totes, bins or vehicles going into or out of the order sortation system 104 to the control system 108.

The control system 108 is communicatively coupled (arrows in FIG. 2A) to and operable to control at least one of the item storage and retrieval system 102 and/or the order sortation system 104. The control system 108 is, optionally communicatively coupled to the transfer mechanisms 110 (e.g., displays 142, wearable heads up displays 144, conveyors 150, robotic vehicles 152, robots with movable robotic appendages 154, robotic vehicles with moveable robotic appendages 158) to control or influence operation of the same, of instance by transmitting control signals or commands, or by transmitting prompts. The control system 108 is optionally communicatively coupled to the destination sortation system 106 to control operation of the same, in a similar fashion.

For example, the control system 108 is operable to adjust a current or future retrieval rate of the item storage and retrieval system 102 and/or a current or future sortation rate of the order sortation system 104 to eliminate a need for any physical item buffering buffer between the item storage and retrieval system 102 and/or the order sortation system 104. The control system 108 can transmit instructions for commands to either directly control operation of the item storage and retrieval system 102 or the order sortation system 104, or to indirectly control those systems by sending instructions or commands to dedicated processor-based control subsystems 200, 210 (FIG. 2A) of the item storage and retrieval system 102 or the order sortation system 104 to at least partially control operation thereof. For example, the control system 108 may send instructions for commands to adjust a current retrieval rate of the item storage and retrieval system 102 and/or a current sortation rate of the order sortation system 106. For instance, the control system 108 may send instructions or commands that adjusts a current retrieval rate or a future retrieval rate to not exceed a current or a future sortation rate. For example, the control system 108 may send instructions or commands that synchronize operation between the item storage and retrieval system 102 and/or the order sortation system 104, for instance matching a retrieval rate (e.g., items output per unit of time) of the storage and retrieval system 102 with an item sortation rate (e.g., items per unit of time) of the order sortation system 104. In performing such, the control system 108 may receive input representative of a current retrieval rate or a future retrieval rate of the item storage and retrieval system 102, and adjusts the current retrieval rate or a future retrieval rate to not exceed the current or the future sortation rate of the order sortation system 104. For example, the control system 108 synchronizes the current retrieval rate of the item storage and retrieval system 102 with the current sortation rate of the sortation system 104 based at least in part on a total number of order collation stations 130 of the order sortation system 104 currently in operation.

In some implementations, the control system 108 may cause or indicate that a second or third order sortation system (not shown) be made operational in parallel with an existing, currently operational order sortation system 104. In some implementations, the control system 108 may cause or indicate that a second or third item storage and retrieval system (not shown) be made operational in parallel with an existing, currently operational item storage and retrieval system 102.

Figure 2B:
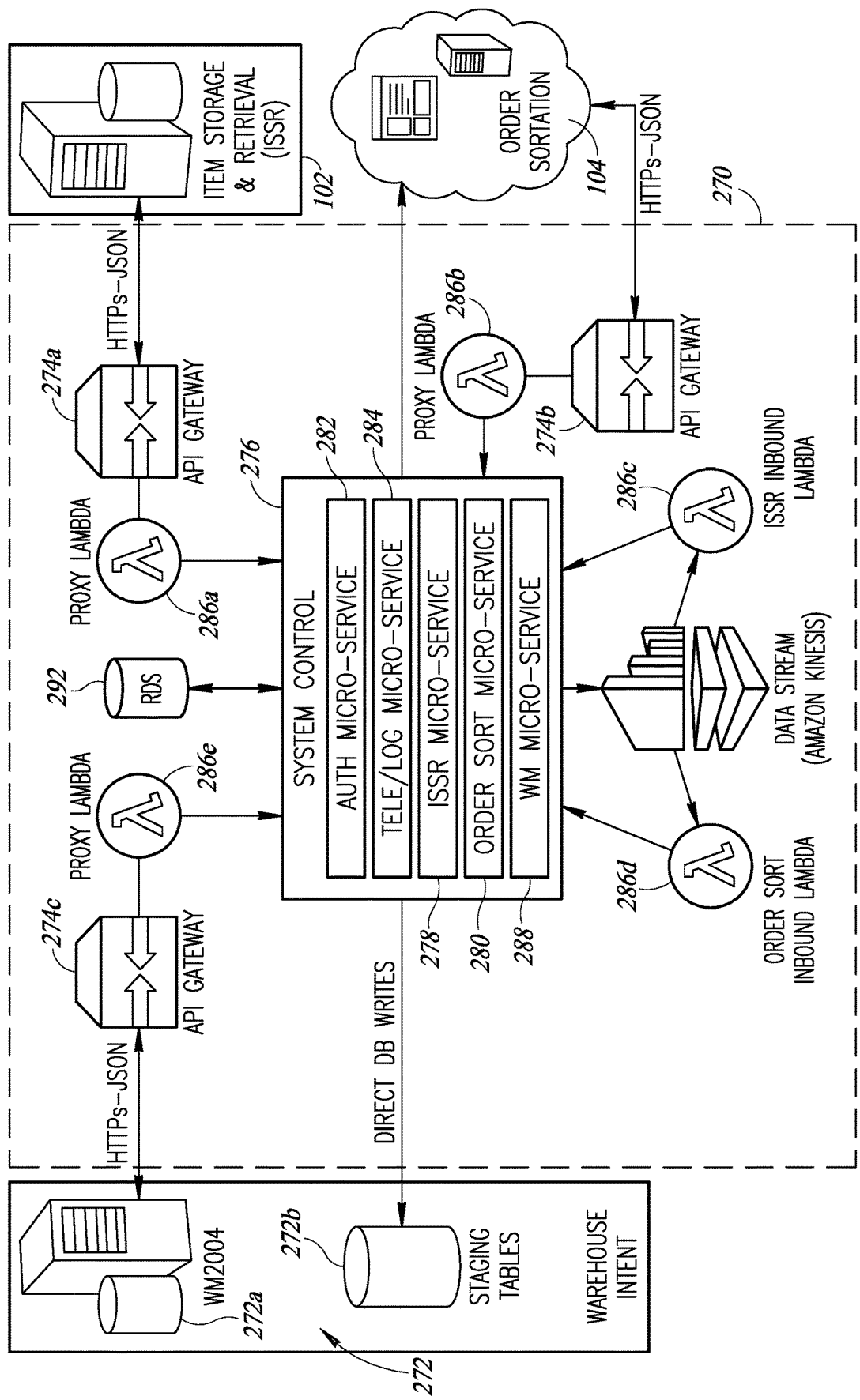
FIG. 2B is a block diagram of an implementation of a fulfillment system, similar to that shown in FIGS. 1 and 2A, and implementing in a cloud architecture, according to at least one illustrated implementation.

FIG. 2B shows of a fulfillment system 100a, similar to that shown in FIGS. 1 and 2A, and implementing in a cloud architecture, according to at least one illustrated implementation.

The control system 108a may take the form of, or be implemented by, a server computer system 270 with one or more server computers. The control system 108 will typically operate 24 hours a day, seven days a week, with a high level of availability (e.g., 99.9%). The control system 108a may advantageously employ redundant server computer systems, with failover capability. The server computer system 270 may, for example, be virtualized or implemented in the cloud, for instance via Amazon Web Services (AWS). The control system 108 may provide command and control functions for one, two or more locations (e.g., locations at which item storage and retrieval system(s) 102 and order sortation system(s) 104, and optionally destination sortation system 106 are located.) The control system 108 may differentiate traffic for each location. The control system 108 may implement error logging for each location, and perform monitoring and alert generation on a location basis.

The control system 108 may implement authentication to allow connection of the controlled systems (e.g., item storage and retrieval system(s) 102, order sortation system(s) 104, and/or destination sortation system(s) 106) by location. The control system 108 can maintain authentication status for each of the controlled systems, and may log all connection and authentication activities. The control system 108 may reject login attempts by unauthorized systems and log such attempts.

The control system 108 may maintain a log of all communications messages. The control system 108 may adhere to communications protocols of the controlled systems (e.g., ATTAbotics ASRS storage and retrieval system, Tompkins t-Sort order sortation system, Tompkins destination sortation system). The control system 108 may automatically attempt to resend messages that fail to initially transmit. The control system 108 may track message that have successful been sent and/or messages that have failed to be sent. The control system 108 may generate a notification in response to a message failing to be successfully sent more than a threshold number (e.g., 3) of attempts. The control system 108 may from time-to-time (e.g., periodically, aperiodically) send test messages to ensure that all communications channels remain available. The control system 108 may have an associate services level agreement with specifics for message processing.

The control system 108 may provide an endpoint for communications from a warehouse management (WM) system 272 that includes one or more processors and one or more nontransitory processor-readable medium that stores a warehouse management data store (e.g., database) 272a and staging tables 272b that stores warehouse data (e.g., records) of inventory, and optionally orders. The control system 108 may, for example, perform JDBC writes and sends to the warehouse management (WM) system 272. The control system 108 may provide an endpoint for communications between the control system 108 and the item storage and retrieval system(s) 102. The control system 108 may provide an endpoint for communications between the control system 108 and the order sortation system 104 and/or the destination sortation system 106.

In some implementations, the control system 108 may be comprised of six major subsystems: 1) an API gateway 274a, 274b, 274c (collectively 274); 2) a system control 276; 3) an item storage and retrieval system micro-service 278; 4) an order sortation micro-service 280; 5) an authentication service 282; and 6) telemetry/logging service 284.

The API gateway 274 may be a server that provides a single entry point into the control system 108. The API gateway 274 encapsulates the internal system architecture and provides an API that is tailored to each client. The API gateway 274 may have other responsibilities, for example authentication, monitoring, load balancing, caching, request shaping an management, and static response handling. The API gateway 274 may forward inbound requests to the system control services via a proxy lambda 286a-286e (collectively 286) (e.g., anonymous functions such as function literal, lambda abstraction, or lambda expression) that is a function definition that is not bound to an identifier). The proxy lambda 286 routes the message to the appropriate service handler.

The system control 276 provides command and control for the control system 108. The supported actions are prioritized, chute management and location management, etc. The system control 276 may comprise three main systems (e.g., item storage and retrieval micro-service 278, order sortation or collation micro-service 280, warehouse management micro-service 288), for example running in an Amazon Elastic Cloud EC2 instance.

The item storage and retrieval micro-service 278 handles incoming and outgoing messages to and from the item storage and retrieval system(s) 102 from the API gateway 274. Such may implement an item storage and retrieval inbound lambda 286 that handles requests that cannot otherwise be finished within a defined time frame, e.g., finished within a defined time frame, e.g., finished within a restful service call, for example retrying transmission of outbound messages. Such may also implement an inbound data stream handling function 290 (e.g., via Amazon Kinesis) to process streaming data, that functions as a message queue, primarily used for handling messages that need to be passed to the warehouse management (WM) system 272 based on processing time.

The order sortation micro-service 280 handles incoming/outgoing messages to and from the order sortation system 104 as passed through the API gateway 274. This may implement a respective inbound lambda 286 to handle requests that cannot be finished with a defined time frame, e.g., finished within a restful service call, for example trying to resend outbound messages. This may also implement an inbound data stream handling function 290 (e.g., via Amazon Kinesis) to process streaming data, that functions as a message queue, primarily used for handling messages that need to be passed to the warehouse management (WM) system 272 based on processing time.

The authentication subsystem 282 provides functionality to verify that correct use of the fulfillment system 100. Only authorized clients are allowed on the fulfillment system 100, via user names, associated passwords and/or associated authorization tokens.

The telemetry and logging subsystem 284 makes used of various technologies (e.g., Datalens®, Datadog®, AWS Cloudwatch®) to provide monitoring and logging of operations and communications.

The system control 276 may implement item storage and retrieval micro-services 278, order sortation micro-services 280, warehouse management (WM) micro-services 288 and optionally destination sortation services (not shown), Instead of implementing warehouse management (WM) inbound services in a warehouse management (WM) microservices module, both the item storage and retrieval microservices 278 and the order sortation micro-services 280 may update the warehouse management (WM) data store (e.g., database) 272a or staging tables 272b directly.

The control system 108 may employ an API gateway 274 for authentication (e.g., Open Authorization, aka OAuth) for both the item storage and retrieval micro-services 278, the order sortation micro-services 280, and may employ an API key for the warehouse management (WM) data store (e.g., database) 272a and staging tables 272b. This may be particularly useful where one system uses an API key and the other system uses OAuth, thus there is no reason to separate OAuth as a single module. Where a writer only writes records into the warehouse management (WM) database, merging the writer into a main function advantageously reduces overhead, which may result in a real-time implementation of the fulfillment system 100a operating more smoothly.

The control system 108 should promptly respond to requests from the item storage and retrieval system 102, the order sortation system 104, and the optional destination sortation system 106. Each request should be acknowledged (ACK) or not acknowledged (NACK), for example via a restful service response. Thus, the control system 108 may, for example, use Amazon Kinesis® 290 to queue NACK retries, as well as other messages that require proceeding operations (e.g., warehouse management (WM) data store (e.g., database) 272a and staging tables 272b writing, chute/tote updating) in order to send responses to the item storage and retrieval system(s) 102, the order sortation system(s) 104, and/or optionally the destination sortation system(s) 106, e.g., via a restful service call. Alternatively, the control system 108 may employ a simple queueing system (SQS). While the SQS may be faster, a thread will be needed to constantly monitor the SQS messages. A further alternative is to fork a thread to call a preceding service before returning a restful service call, but that risks losing a message if, for example, the system goes down during the time that the restful service all returns and before proceeding thread is finished. For most acknowledges, no action needs to be taken. Use of a lambda 286 after Amazon Kinesis® 290 picks up messages that need to be processed by the warehouse (WM) system 272 which can be done asynchronously. The system control 276 may, for example, be hosted in the cloud, for instance via Amazon Web Services (AWS) via Elastic Cloud EC2 instances.

A persistent data store 292 (e.g., Amazon Relational Database Service (RDS)) may be employed to store certain information, e.g., access token, refresh token, id-payload mapping, chute information, tote information. An access token is typically valid for a limited period of time (e.g., an hour), so there is no reason to have every thread receiving an access token from refresh token. Instead, one thread refreshes the access token and shares it with the other threads.

Figure 3:
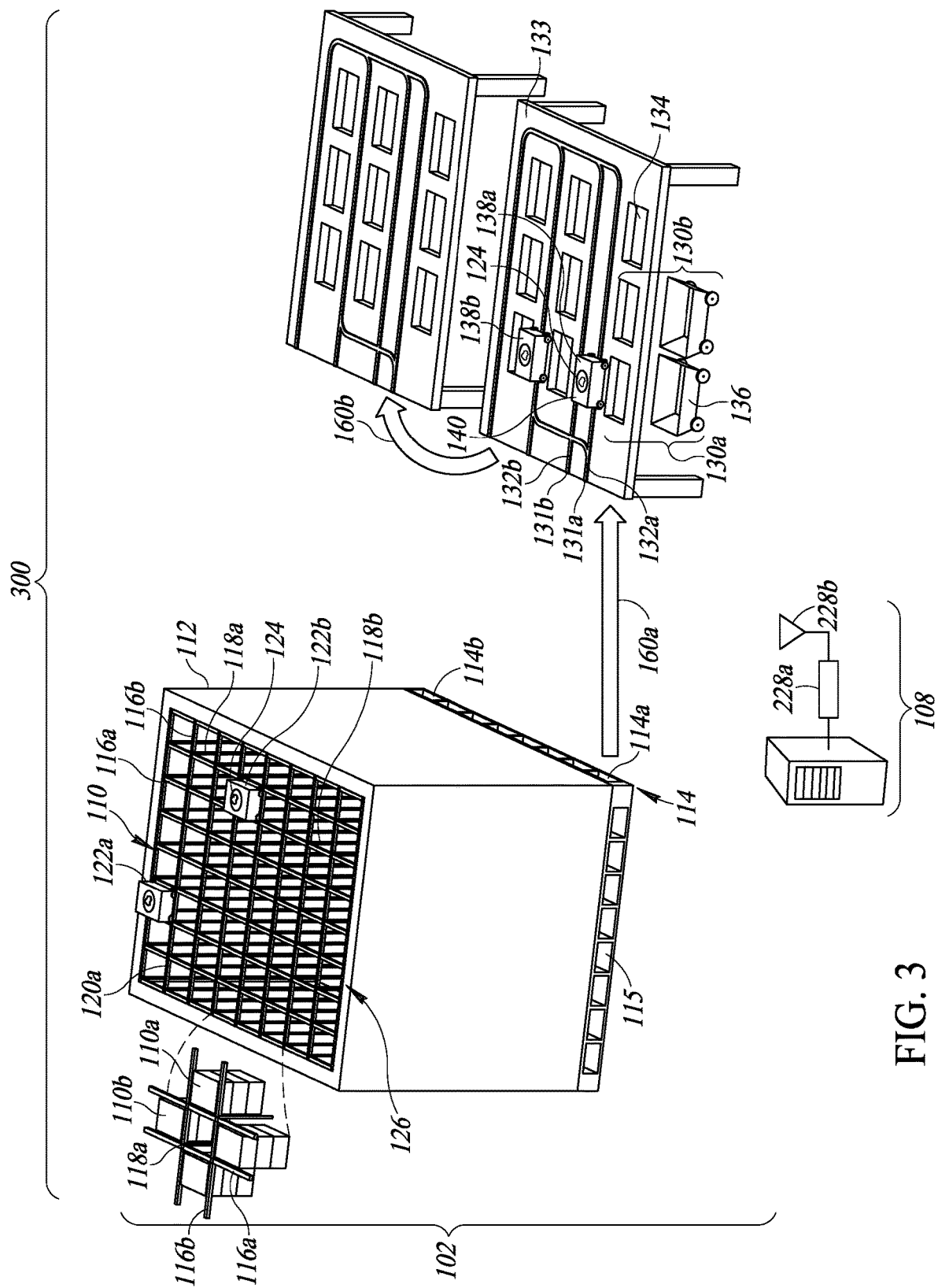
FIG. 3 shows a fulfillment system according to at least one illustrated implementation, the fulfillment system including an item and storage retrieval system, an order sortation system, an optional destination sortation system, and a control system operable to control operation of at least one of the item storage and retrieval system and the order sortation system to advantageously eliminate any need for any physical item buffering buffer, where a single set of robotic vehicles both retrieve items from the storage locations, compartments, or spaces of the item and storage retrieval system and to transport the retrieved items to the collation stations of the order sortation system.

FIG. 3 shows a fulfillment system 300, according to at least one illustrated embodiment. Many of the components of the fulfillment system 300 are similar or even identical to the components of the fulfillment system 100. Similar or even identical components are indicated with the same reference numbers as used in the implementation of FIG. 1. Only some of the more significant differences between the fulfilment system 300 and the fulfillment system 100 are described below.

In contrast to the fulfillment system 100, the fulfillment system 300 employs a single set of robotic vehicles to both retrieve items 124 from the storage locations, compartments, or spaces 110 of the item and storage retrieval system 102 and to transport the retrieved items 124 to the collation stations 130 of the order sortation system 104. Again, this approach advantageously eliminates any need for a physical item buffering buffer between the item and storage retrieval system 102 and the order sortation system 104.

Figure 4:
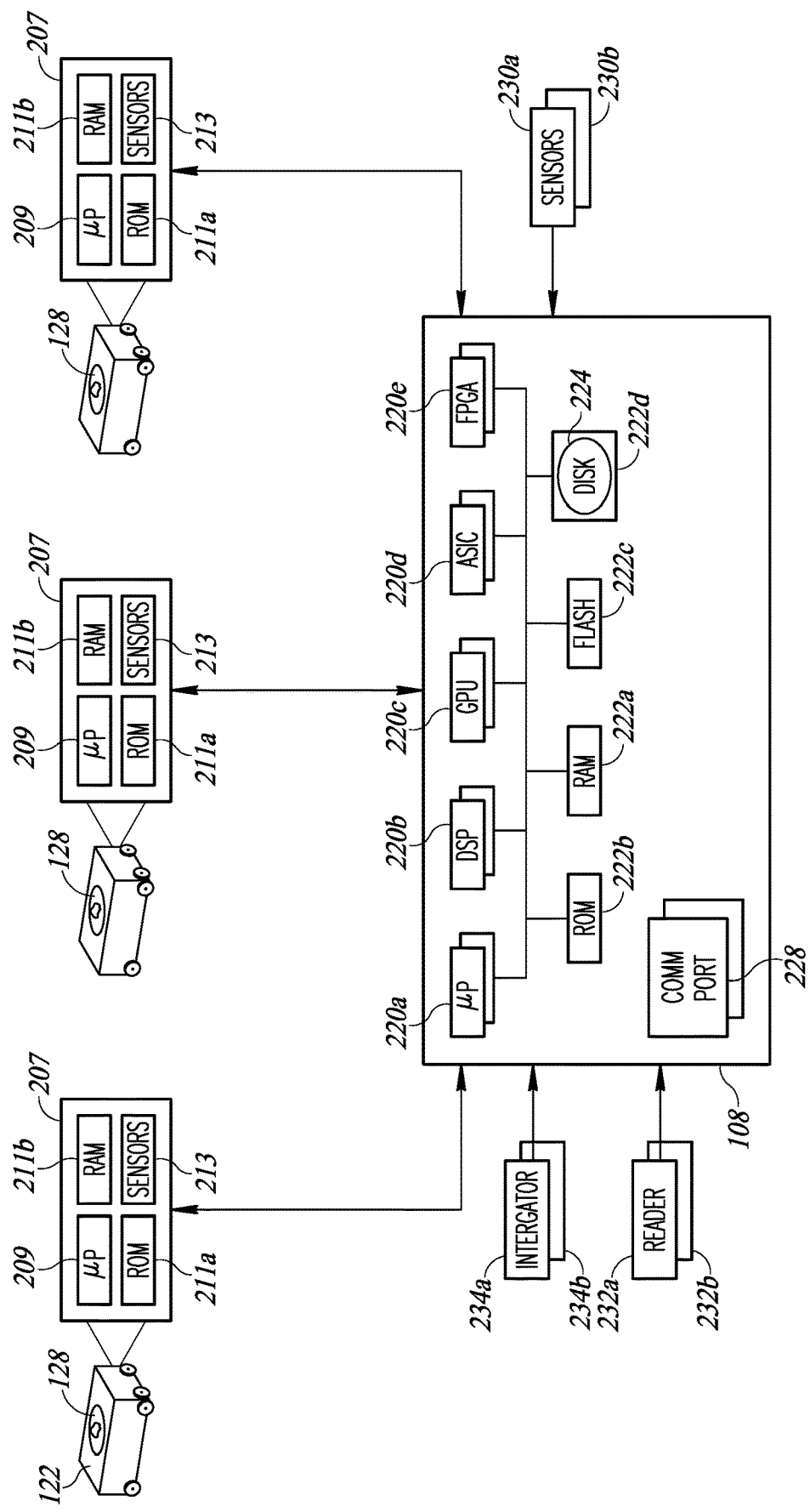
FIG. 4 is a block diagram of the control system of FIG. 3 according to at least one illustrated implementation, the control system communicatively coupled to directly control operation of the item storage retrieval system, the order sortation system, and optionally the destination sortation system without any respective dedicated control systems.

FIG. 4 illustrates the control systems of the fulfillment system 300 of FIG. 3. Many of the control components of the fulfillment system 300 are similar or even identical to the control components of the fulfillment system 100 illustrated in FIG. 2A. Similar or even identical components are indicated with the same reference numbers as used in the implementation of FIG. 2A. Only some of the more significant differences between the fulfilment system 300 and the fulfillment system 100 are described below.

As illustrated in FIG. 4, the control system directly controls operation of the item and storage retrieval system 102, directly controls operation of the order sortation system 104, and directly controls operation of the robotic vehicles that both retrieve items 124 from the storage locations, compartments, or spaces 110 of the item and storage retrieval system 102 and to transport the retrieved items 124 to the collation stations 130 of the order sortation system 104.

Figure 5:
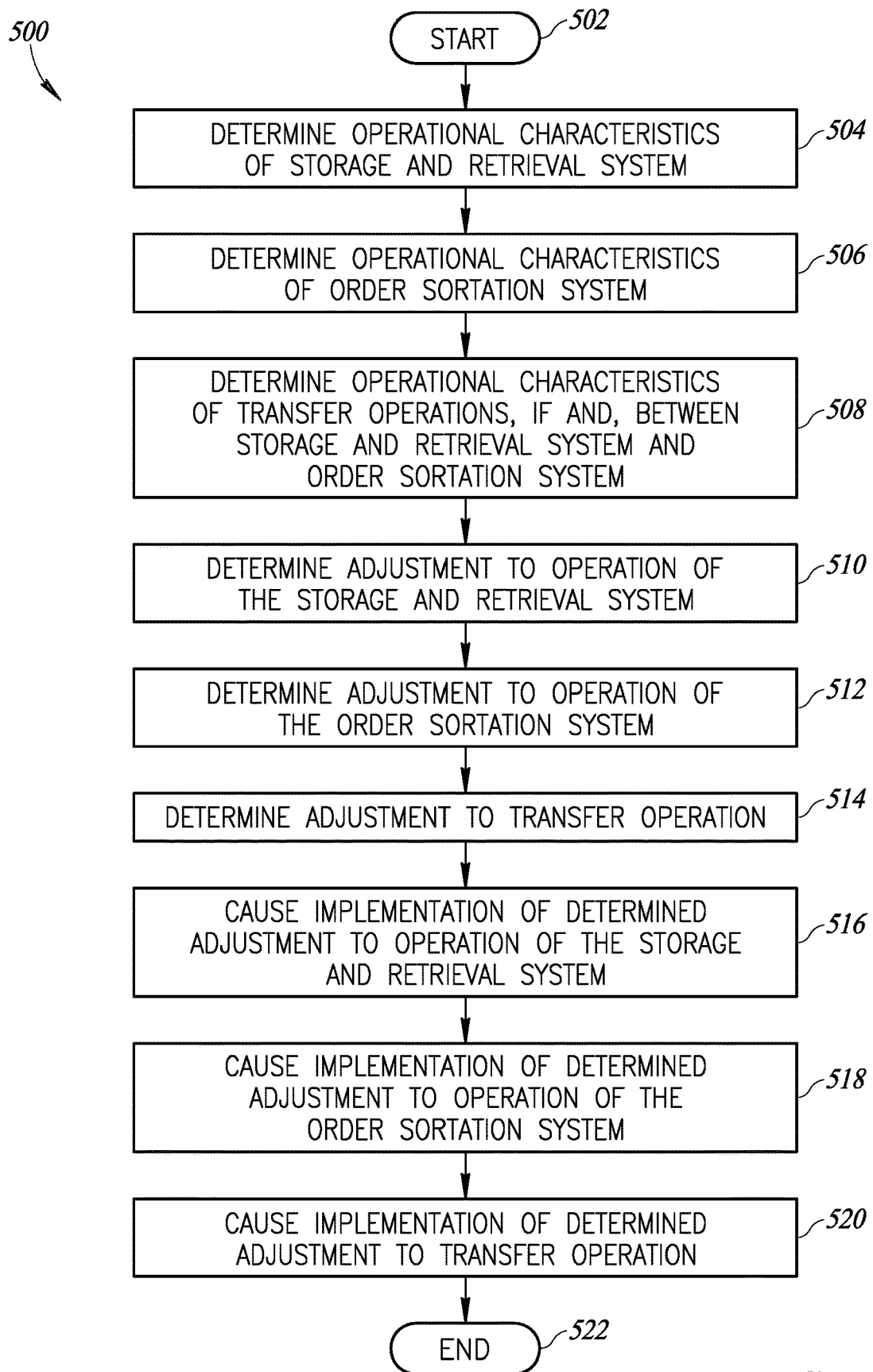
FIG. 5 is a flow diagram of a method of operation in a fulfillment system according to at least one illustrated implementation.

FIG. 5 shows a method 500 of operation of a fulfillment system, according to at least one illustrated implementation. The method can be employed with an of the fulfillment systems described herein, as well as with various variations of those fulfillment systems.

The method 500 starts at 502, for example in response to powering up of the fulfillment system or a component thereof, or in response to an invocation or call to a program, or receipt of information.

Optionally at 504, at least one processor determines one or more operational characteristics of an item storage and retrieval system. The at least one processor may, for example be part of a control system of the fulfillment system. As explained above, in some implementations, the at least one processor is part of a control system that interoperates with or mediates between respective "standalone" control systems of an item storage and retrieval system and of a sortation system, neither or which may have been designed or manufactured or configured to operate with the other.

For example, the at least one processor may receive wired and/or wireless signals that include information that represents various operational characteristics of the item storage and retrieval system. The information may be automatically collected via one or more sensors, for example one or more digital cameras, motions sensors, proximity sensors, positional encoders, rotary encoders, Reed switches. The information may, for example, be manually entered by an operator via a keyboard, keypad or graphical user interface (GUI). The information may, for example, represent a current or a future item retrieval rate, i.e., the rate at which the item and retrieval system retrieves and provides items or totes containing items. The item retrieval rate may in at least some implementations be completely or strongly influenced by a total number of output stations of the item storage and retrieval system that are available or operational at any given time. The number of available or operational output stations will typically has some upper limited, set by the infrastructure of the particular item storage and retrieval system. For example, the physical structure and layout of the item storage and retrieval system will typically place an inherent upper limit on the total number of output stations that can be employed. Also for example, the inherent upper limit is typically based on: a total number of robots employed in the item storage and retrieval system, the speed of those robots, a maximum time and/or an average time to retrieve items or totes and transport the retrieved items or totes to the output stations, and a total number of available paths for the robots and hence the ability to avoid collisions with other robots or the probability of avoiding collision. It is noted that collision avoidance may be reflected in other forms, for example in a predicted average time it takes to retrieve items and provide the retrieved items to the output stations. For instance, the average time may reflect an average number of times, and average length of time, that a robot will likely need to stop and wait during transit in order to allow another robot to pass in order to avoid a collision. Such may be influenced by the robustness of a collision avoidance logic in a motion planning algorithm. The number of available or operational output stations may additionally be controlled by a total number of transfer mechanisms or personnel available or assigned to transfer items from the output stations to the sortation system. As previously noted, robotic vehicles, robots with robotic appendages, conveyor systems (e.g., active/driven conveyor belts, passive/roller/gravity conveyors), or even humans can transfer items from the output stations of the item storage and retrieval system to one or more input stations of the sortation system.

Optionally at 506, at least one processor determines one or more operational characteristics of an order sortation system. The at least one processor may, for example be part of a control system of the fulfillment system. As explained above, in some implementations, the at least one processor is part of a control system that interoperates with or mediates between respective "standalone" control systems of an item storage and retrieval system and of a sortation system, neither or which may have been designed or manufactured or configured to operate with the other.

For example, the at least one processor may receive wired and/or wireless signals that include information that represents various operational characteristics of the order sortation system. The information may be automatically collected via one or more sensors, for example one or more digital cameras, motions sensors, proximity sensors, positional encoders, rotary encoders, Reed switches. The information may, for example, be manually entered by an operator via a keyboard, keypad or graphical user interface (GUI). The information may, for example, represent a current or a future item sortation rate, i.e., the rate at which the order sortation system sorts items into orders (i.e., sets of one or more items that constitute a respective order). The sortation rate may in at least some implementations be completely or strongly influenced by a total number of order collation positions of the order sortation system that are available or operational at any given time. The sortation rate may additionally or alternatively be completely influenced by a total number of input stations of the order sortation system that are available or operational at any given time. The number of available or operational order collation positions will typically has some upper limited, set by the infrastructure of the particular order sortation system. For example, the physical structure and layout of the order sortation system will typically place an inherent upper limit on the total number of order collation positions that can be employed. Also for example, the inherent upper limit is typically based on: a total number of robots employed in the order sortation system, the speed of those robots, a maximum time and/or an average time to transit items or totes from one or more input positions to the order collation positions, and a total number of available paths for the robots and hence the ability to avoid collisions with other robots or the probability of avoiding collision. It is noted that collision avoidance may be reflected in other forms, for example in a predicted average time it takes to transit the items or totes to the order collation positions. For instance, the average time may reflect an average number of times, and average length of time, that a robot will likely need to stop and wait during transit in order to allow another robot to pass in order to avoid a collision. Such may be influenced by the robustness of a collision avoidance logic in a motion planning algorithm. The number of available or operational order collation positions may additionally be controlled by a total number of transfer mechanisms or personnel available or assigned to transfer items from the output stations to a destination sortation system. As previously noted, robotic vehicles, robots with robotic appendages, conveyor systems (e.g., active/driven conveyor belts, passive/roller/gravity conveyors), or even humans can transfer items from the order collation positions of the order sortation system to one or more input stations of the destination sortation system.

Optionally at 508, at least one processor determines one or more operational characteristics of transfer operations, if any, between storage and retrieval system and order sortation system. The at least one processor may, for example be part of a control system of the fulfillment system. As explained above, in some implementations, the at least one processor is part of a control system that interoperates with or mediates between respective "standalone" control systems of an item storage and retrieval system and of a sortation system, neither or which may have been designed or manufactured or configured to operate with the other.

The operational characteristics of the transfer operations, if any, between storage and retrieval system and order sortation system will typically be based on the specific mechanisms, total number of mechanisms, and speed of operation of those mechanisms, which are in operation or which will be put into operation at a specified time. As noted above, a wide variety of mechanisms are available to effect a transfer from the item storage retrieval system to the sortation system. These can include any one or more of: one or more wheel robots, one or more robots with robotic appendages, one or more robotic vehicles with robotic appendages, one or more of various types of conveyors, and even one or more humans. In at least some implementations, a robotic vehicle can be employed to both retrieve an item/tote/bin from a storage location of the item storage and retrieval system and to deliver the retrieved item/tote/bin to an open chute or open order collation station of the order sortation system. Rate of retrieval may represent the number of items/totes/bins that can be retrieved from respective storage locations and delivered to pick stations or output stations per unit of time. Such can be an average or median, accommodating differences in time to reach more remote storage locations or more remote pick stations or output stations, than more proximate ones. The rate of sortation may represent the time to move retrieved items/totes/bins to an open chute or collation position of the order sortation system, from an input station thereof. Such may also represent the time it takes to transfer the retrieved items/totes/bins to the order sortation system from the picker stations or output stations of the item storage and retrieval system. Thus, such may reflect time to "pick" the retrieved items/totes/bins by a human, a robotic appendage or robotic vehicle, and any time to transit along a conveyor, if any.

Optionally at 510, at least one processor determines one or more adjustments, if any, to be made to the operation of the item storage and retrieval system. The at least one processor may, for example be part of a control system of the fulfillment system. As explained above, in some implementations, the at least one processor is part of a control system that interoperates with or mediates between respective "standalone" control systems of an item storage and retrieval system and of a sortation system, neither or which may have been designed or manufactured or configured to operate with the other.

Optionally at 512, at least one processor determines one or more adjustments, if any, to be made to the operation of the order sortation system. The at least one processor may, for example be part of a control system of the fulfillment system. As explained above, in some implementations, the at least one processor is part of a control system that interoperates with or mediates between respective "standalone" control systems of an item storage and retrieval system and of a sortation system, neither or which may have been designed or manufactured or configured to operate with the other.

Optionally at 514, at least one processor determines one or more adjustments, if any, to be made to the operation of the transfer operations. The at least one processor may, for example be part of a control system of the fulfillment system. As explained above, in some implementations, the at least one processor is part of a control system that interoperates with or mediates between respective "standalone" control systems of an item storage and retrieval system and of a sortation system, neither or which may have been designed or manufactured or configured to operate with the other.

Optionally at 516, at least one processor causes one or more determined adjustments, if any, to be made to the operation of the item storage and retrieval system. The at least one processor may, for example, be part of a control system of the fulfillment system. As explained above, in some implementations, the at least one processor is part of a control system that interoperates with or mediates between respective "standalone" control systems of an item storage and retrieval system and of a sortation system, neither or which may have been designed or manufactured or configured to operate with the other. Thus, for example, the one or more processors may send instructions or commands to a processor or display or other presentation component of the item storage or retrieval system to reconfigure operation thereof, and/or to some other device (e.g., standalone computer, smartphone, tablet computer, wearable heads up display) to prompt a human user to take one or more actions (e.g. add personnel, manually reconfigure the item storage and retrieval system.

For example, the one or more processors may send instructions or commands that cause the item storage and retrieval system to automatically add or reduce the total number of output stations in operation. For example, the one or more processors may send instructions or commands that cause a human to manually add or reduce the total number of output stations in operation, including for instance adding or reducing personnel, transfer robots and/or conveyors to accommodate the adjusted number of output stations, and/or prompting a human to manually adjust one or more operational characteristics of the item storage and retrieval system, for instance via a dedicated operational interface of the item storage and retrieval system. This can include causing the item storage and retrieval system to adjust its motion planning to direct robots to an adjusted number of output stations. In some instances, this may also include adjusting the particular paths and total number of paths available through the item storage and retrieval system.

Additionally or alternatively, the one or more processors may send instructions or commands that cause an adjustment to a rate at which pick requests a generated, sent or submitted to the item storage and retrieval system.

For example, the control system 108 may monitor a rate at which robotic vehicles 36 retrieve and deliver items the output stations of the item storage and retrieval system in response to pick requests, as well as the amount of time required for the items to transferred from the robotic vehicles and be placed into a destination container at an order collation station. Employing this information with a knowledge of the total number of output stations (e.g., picker stations) in a picker area and a known number of order collation stations or destination containers in a sorting area, the control system 108 may determine a rate at which pick requests are made. More specifically, the rate at which pick requests are made can, for example, be directly proportional to the rate at which robotic vehicles 36 retrieve and deliver items the output stations of the item storage and retrieval system in response to pick requests, as well as the amount of time required for the items to transferred from the robotic vehicles and be placed into a destination container at an order collation station, the known number of output or "picker" stations in the picker area and the known number of collation stations or destination containers in the sorting area. Consequently, should the rate at which items are transferred from the robotic vehicles of the item storage and retrieval system fall behind the rate at which items are being placed in destination containers at the collation stations, the control system 108 may correspondingly increase rate at which pick requests are made or submitted. This may, for instance, include directing more robotic vehicles to other output or "pick" stations up to the total number of output or "pick" stations available at the particular item storage and retrieval system. Conversely, should the rate at which the items are transferred from the robotic vehicles of the item storage and retrieval system exceed the rate at which items are being placed in destination containers at the order collation stations of the order sortation system, the control system 108 may correspondingly decrease a rate at which pick requests are made or submitted.

Additionally or alternatively, the one or more processors may send instructions or commands that cause the item storage and retrieval system to automatically add or reduce the total number of robots operating to retrieve, or even replenish, items in the item storage and retrieval system.

Additionally or alternatively, the one or more processors may send instructions or commands that cause an adjustment in a speed of operation (e.g., speed of transit, speed of retrieval operation) of the robots operating to retrieve, or even replenish, items in the item storage and retrieval system.

Additionally or alternatively, the one or more processors can switch a mode of operation of the robots. For instance, in a first mode of operation the robots that retrieve the items or totes from the storage locations of the item storage and retrieval system may also deposit the retrieved items or totes at destination collation positions of the order sortation system. Where the round trip transit time or average or predicted round trip transit time of the robots exceeds some defined threshold, or where demand exceeds what is acceptable given the round trip or average or predicted round trip transit times, the processors may cause a switch to a second mode of operation. In the second mode of operation, a first set of robots is used to retrieve items or totes and delivery such to the output stations of the item storage and retrieval system, while a second, different, set of robots are employed to move the retrieved items or totes from the output stations to the destination collation positions of the order sortation system.

Additionally or alternatively, the one or more processors cause a second or additional instance of another to item storage and retrieval system to become operational, for instance where a first or already operational item storage and retrieval system is unable to keep up with the throughput of the order sortation system(s).

Optionally at 518, at least one processor causes the one or more determined adjustments, if any, to be made to the operation of the order sortation system. The at least one processor may, for example be part of a control system of the fulfillment system. As explained above, in some implementations, the at least one processor is part of a control system that interoperates with or mediates between respective "standalone" control systems of an item storage and retrieval system and of a sortation system, neither or which may have been designed or manufactured or configured to operate with the other. Thus, for example, the one or more processors may send instructions or commands to a processor or display or other presentation component of the order sortation system to reconfigure operation thereof, and/or to some other device (e.g., standalone computer, smartphone, tablet computer, wearable heads up display) to prompt a human user to take one or more actions (e.g. add personnel, manually reconfigure the order sortation system.

For example, the one or more processors may send instructions or commands that cause the order sortation system to automatically add or reduce the total number of destination collation positions in operation. For example, the one or more processors may send instructions or commands that cause a human to manually add or reduce the total number of destination collation positions in operation, including for instance adding or reducing personnel, transfer robots and/or conveyors to accommodate the adjusted number of destination collation positions, and/or prompting a human to manually adjust one or more operational characteristics of the order sortation system, for instance via a dedicated operational interface of the order sortation system. This can include causing the order sortation system to adjust its motion planning to direct robots to an adjusted number of destination collation positions. In some instances, this may also include adjusting the particular paths and total number of paths available through the order sortation system. In some implementations, this can additionally or alternatively include adjusting a number of input stations of the order sortation system.

Additionally or alternatively, the one or more processors may send instructions or commands that cause the order sortation system to automatically add or reduce the total number of robots operating to move items to the destination collation positions. Additionally or alternatively, the one or more processors may send instructions or commands that cause an adjustment in a speed of operation (e.g., speed of transit, speed of retrieval operation) of the robots operating to move items to the destination collation positions of the order sortation system.

Optionally at 520, at least one processor causes the one or more determined adjustments, if any, to be made to the operation of the transfer operations. The at least one processor may, for example be part of a control system of the fulfillment system. As explained above, in some implementations, the at least one processor is part of a control system that interoperates with or mediates between respective "standalone" control systems of an item storage and retrieval system and of a sortation system, neither or which may have been designed or manufactured or configured to operate with the other. Thus, for example, the one or more processors may send instructions or commands to a processor or display or other presentation component of one or more transfer systems (e.g., transfer robots, conveyor control system) to reconfigure operation thereof, and/or to some other device (e.g., standalone computer, smartphone, tablet computer, wearable heads up display) to prompt a human user to take one or more actions (e.g. add personnel, manually reconfigure one or more transfer systems.

For example, the one or more processors may send instructions or commands that cause the transfer mechanism (s) in operation to be automatically added or reduced in total number of transfer mechanisms. For example, the one or more processors may send instructions or commands that cause a human to manually add or reduce the total number of transfer mechanism(s) in operation, including for instance adding or reducing personnel, transfer robots and/or conveyors to accommodate an adjusted number of output stations of the item storage and retrieval system, input positions or destination collation positions of the order sortation system, and/or prompting a human to manually adjust one or more operational characteristics of the transfer mechanisms. This can include adding or reducing personnel where transfer is in whole or in part, performed manually. This can include adding or reducing a number of transfer robots (vehicle robots with wheels, tires, pinions or tracks, robots with moveable robotic appendages, robotic vehicles with moveable robotic appendages), and/or adjusting a speed of operation of the same or adjusting motion planning for the same. This can include adding or reducing a total number of conveyors, and/or a speed of operation of the conveyors. In some instances, this may also include adjusting the particular paths and total number of paths available between the item storage and retrieval system and the order sortation system.

The method 500 terminates at 522, for example until invoked again. Alternatively, the method 500 may repeat during operation of the fulfillment system. The method 500 may, for example be executed as multiple threads on a multi-threaded processor.

Various implementations described wherein advantageously route items from an item storage and retrieval system to an order sorting or sortation system for collation/packing/shipping without or with fewer intermediate sequencing operations, which sequencing operations are typically employed in conventional approaches to sequence orders upfront. This reduction or elimination of intermediate sequencing may result in significantly reducing or even eliminating wait times associated with item aggregation.

As previously explained, convention fulfillment approaches require buffer sequencing logic to organize or re-sequence or curate items in a logical order, before presenting the items in the correct order needed to pass along next operation (e.g., sortation, packing and shipping). For example, an automated storage retrieval system typically sequences items across totes before delivering to a "Goods to Person" station where picking and packing an order for a customer or store occurs. In another example, a product sorter typically sequences items across totes (containers, pockets) also before delivering to a "Goods to Person" station wherein before picking and packing an order for a customer or store occurs.

One disadvantage of these and other conventional approaches is that they require aggregating/organizing items stored across containers, needed for the same store or customer, before passing off the items to the next operation (e.g., sortation, collation, packing). This aggregating/organizing items upstream of packing results in increased wait times, requires un-necessary acts to shift un-used items around, and requires complex programming logic to correctly sequence the items, before delivering the items to the next operation for sortation, packing and shipping. This and other issues with conventional systems are addressed by the approached described herein which combine storage and retrieval and sorting in an integrated system, advantageously eliminating the buffer sequencing logic in fulfillment systems that conventionally require item aggregation before presenting to the items to next station At least one advantage of various approaches described herein is the elimination of the need for items (units)/container aggregation, before delivering the items/units/containers to the next operation (e.g., packing, shipping).

Conventional fulfillment systems (e.g., ATTAbotics ASRS system, Tompkins t-Sort system) perform similar and overlapping tasks. By modifying each system to eliminate sequencing, which is a key part of each system, important aspects of each system may be combined in a new and complementary way. Stated another way, large aspects of conventional systems are redundant, such that combining them in an un-altered form, would not provide maximum efficiency benefits. However, by integrating the retrieval aspect of one conventional fulfilment system (e.g., ATTAbotics ASRS system) and directly interfacing it with another conventional fulfilment system (e.g., Tompkins t-Sort system), a much more efficient system is created. By changing the fundamentals of operation of both systems (e.g., co-operating the two systems and adjusting operation of at least one based on the other), results in a more efficient fulfillment system. By combing storage and retrieval, and sorting functions, various robots (e.g., all-purpose robots; or customized storage and retrieval robots and separate customized sorting robots) or individuals employed by the fulfilment system no longer need to wait until all totes/bins/containers with needed product are grouped together before passing off to the next point.

The above description of illustrated implementations and embodiments, including what is described in the Abstract, is not intended to be exhaustive or to limit the embodiments to the precise forms disclosed. Although specific implementations and embodiments of and examples are described herein for illustrative purposes, various equivalent modifications can be made without departing from the spirit and scope of the disclosure, as will be recognized by those skilled in the relevant art.

For example, the fulfillment system may employ a single type (make/model/design) of robotic vehicle for use in the item storage and retrieval system, the order sortation system and the optional destination sortation system. Alternatively, the fulfillment system may employ different types of robotic vehicles for the item storage and retrieval system and the order sortation system. The order sortation system and the optional destination sortation system may employ a same type of robotic vehicle. Also for example, separate fleets of robotic vehicles may be used in the respective item storage and retrieval system, the order sortation system and the optional destination sortation system. Alternatively, a common fleet of robotic vehicles can be employed in the item storage and retrieval system, the order sortation system and the optional destination sortation system. Also for example, the fulfillment system may employ a different standardized sets of bins, containers or totes in the item storage and retrieval system, as compared to those employed in the order sortation system and the optional destination sortation system. Alternatively, the fulfillment system may employ a single standardized set of bins, containers or totes in the item storage and retrieval system, the order sortation system and the optional destination sortation system. The teachings herein can be applied to, for example, replenish inventory at a retail location, and/or to prepare customer orders for delivery, whether those orders were received at a physical retail location or via an e-commerce platform.

The teachings provided herein of the various implementations and embodiments can be applied to other systems and robots including robotic vehicles, not necessarily the exemplary fulfillment systems illustrated and generally described above. The methods described herein may include additional acts, omit some acts, and/or perform some acts in a different order. One or more thresholds may be employed.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative implementation or embodiment applies equally regardless of the particular type of physical signal bearing media used to actually carry out the distribution. Examples of signal bearing media include, but are not limited to, the following: recordable type media such as floppy disks, hard disk drives, CD ROMs, digital tape, and computer memory.

To the extent that they are not inconsistent with the teachings herein, U.S. provisional patent application Ser. No. 62/582,727, filed Nov. 7, 2017; and International (PCT) patent application Serial No. PCT/US2018/059690, filed Nov. 7, 2018, which are each hereby incorporated herein by reference in their entireties.

The various embodiments described above can be combined to provide further embodiments. Aspects of the embodiments can be modified, if necessary, to employ systems, circuits and concepts of the various patents, applications and publications identified herein to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A fulfillment system, comprising:
    an item storage and retrieval system comprising: a three-dimensional array of storage spaces from which items are automatically retrievable at one or more retrieval rates via one or more robots in response to commands;
    an order sorting system positioned downstream from the item storage and retrieval system in a fulfillment flow, the order sortation system comprising a plurality of order collation positions to which items are sortable at one or more sortation rates to collate one or more items that belong to respective ones of a plurality of orders in response to commands without any physical item buffering buffer at the order collation stations and without any physical item buffering buffer between the item storage and retrieval system and the order collation stations; and
    a control system operable to adjust at least one of: a current one of the retrieval rates of the item storage and retrieval system or a current one of the sortation rates of the order sortation system to eliminate a need for any physical item buffering buffer and communicatively coupled to at least one of the item storage and retrieval system or the order sortation system to at least partially control operation thereof to adjust the current retrieval rate of the item storage and retrieval system and the current sortation rate of the order sortation system, wherein the control system synchronizes the current retrieval rate or a future retrieval rate of the item storage and retrieval system with the current sortation rate or a future sortation rate of the order sortation system, respectively.

2. The fulfillment system of claim 1 wherein the one or more robots comprise a plurality of robotic vehicles independently operable to retrieve items or totes containing items from the storage spaces.

3. The fulfillment system of claim 2 wherein the item storage and retrieval system includes a number of output stations and the robotic vehicles are operable to deposit the retrieved items or totes containing items at specified ones of the output stations of the item storage and retrieval system, the robotic vehicles comprising part of the item storage and retrieval system.

4. The fulfillment system of claim 3 wherein the order sortation system has a number of input stations, and further comprising:
    a number of transfer robots positioned and operable to transfer items from the output stations of the item storage and retrieval system to the number of input stations of the order sortation system.

5. The fulfillment system of claim 3 wherein the transfer robots are each a respective robotic vehicle or includes a respective robotic appendage.

6. The fulfillment system of claim 3 wherein to the order sortation system has a number of input stations, and further comprising:
    at least one belt conveyor line positioned and operable to transfer items from the output stations of the item storage and retrieval system to the number of input stations of the order sortation system.

7. The fulfillment system of claim 2 wherein the order sortation system includes a number of input stations and the robotic vehicles are operable to deposit the retrieved items or totes containing items at specified ones of the input stations of the order sortation system without any physical item buffering buffer between the item storage and retrieval system and the order sortation system.

8. The fulfillment system of claim 2 wherein the robotic vehicles are operable to deposit the retrieved items or totes containing items at specified ones of the order collation positions of the order sortation system without any physical item buffering buffer between the item storage and retrieval system and the order sortation system.

9. The fulfillment system of claim 1 wherein the control system receives input representative of the current sortation rate or a future sortation rate of the order sortation system, and adjusts the current retrieval rate or a future retrieval rate to not exceed the current or the future sortation rate.

10. The fulfillment system of claim 9 wherein the current or the future sortation rate is based, at least in part, on a total number of order collation positions of the order sortation system currently in operation or to be placed into operation in the future.

11. The fulfillment system of claim 9, further comprising:
    a number of sensors that sense the current sortation rate of the order sortation system, the sensors communicatively coupled to provide an indication of the current sortation rate to the control system.

12. The fulfillment system of claim 1 wherein the control system receives input representative of the current retrieval rate or a future retrieval rate of the item storage and retrieval system, and adjusts the current retrieval rate or a future retrieval rate to not exceed the current or the future sortation rate.

13. The fulfillment system of claim 12 wherein the current retrieval rate or a future retrieval rate is based, at least in part, on a total number of output positions of the item storage and retrieval system currently in operation or to be placed into operation in the future.

14. The fulfillment system of claim 13, further comprising:
    a number of sensors that sense the current retrieval rate of the item storage and retrieval system, the sensors communicatively coupled to provide an indication of the current retrieval rate to the control system.

15. The fulfillment system of claim 1 wherein item storage and retrieval system is a standalone system from a first manufacturer and the order sortation system is a standalone system from a second manufacturer, the second manufacturer different and independent from the first manufacturer.

16. The fulfillment system of claim 1 wherein the item storage and retrieval system comprises a number of output stations.

17. The fulfillment system of claim 16 wherein the number of output stations of the item storage and retrieval system in operation is variable over time, and the control system synchronizes the current retrieval rate of the storage and retrieval system with the current sortation rate of the sortation system based at least in part on a total number of output stations of the item storage and retrieval system currently in operation.

18. The fulfillment system of claim 16 wherein the number of order collation positions of the sortation system in operation is variable over time, and the control system synchronizes the current retrieval rate of the storage and retrieval system with the current sortation rate of the sortation system based at least in part on a total number of order collation of the sortation system currently in operation.

19. The fulfillment system of claim 1 wherein the sortation system comprises one or more paths and the order collation positions are respective positions along and spaced relatively below the one or more paths.

20. The fulfillment system of claim 1 wherein the sortation system sorts orders placed directly by end customers and placed by retailer specific locations.

21. The fulfillment system of claim 1, further comprising:
a destination sortation system positioned downstream from the an order sorting system in the fulfillment flow, the destination sortation system comprising a plurality of destination collation positions, and which collates orders, which comprise one or more items, based on a commonality in a respective destination to which the orders are to be delivered, without any physical item buffering buffer between the item storage and retrieval system and the destination sortation system.

22. The fulfillment system of claim 1 wherein the item storage and retrieval system further comprises a dedicated processor-based item storage and retrieval control system and the control system of the fulfillment system is communicatively coupled to send commands to the dedicated processor-based item storage and retrieval control system to control operation of one or more robots.

23. The fulfillment system of claim 1 wherein the sortation system further comprises a dedicated processor-based sortation system control system and the control system of the fulfillment system is communicatively coupled to send commands to the dedicated processor-based sortation system control system to control operation of one or more robots.

24. The fulfillment system of claim 1 wherein the control system of the fulfillment system is communicatively coupled to send commands directly to respective dedicated control systems of the robot vehicles without any intervening control systems.

25. The fulfillment system of claim 1, further comprising:
a processor-based warehouse management system including at least one nontransitory processor-readable medium that implements a warehouse data store that stores information representative of inventory, wherein the control system of the fulfillment system is communicatively coupled to the processor-based warehouse management system to update the information representative of inventory in the warehouse data store.

26. A fulfillment system, comprising:
an item storage and retrieval system comprising: a three-dimensional array of storage spaces from which items are automatically retrievable at one or more retrieval rates via one or more robots in response to commands;
an order sorting system positioned downstream from the item storage and retrieval system in a fulfillment flow, the order sortation system comprising a plurality of order collation positions to which items are sortable at one or more sortation rates to collate one or more items that belong to respective ones of a plurality of orders in response to commands without any physical item buffering buffer at the order collation stations and without any physical item buffering buffer between the item storage and retrieval system and the order collation stations; and
a control system operable to adjust at least one of: a current one of the retrieval rates of the item storage and retrieval system or a current one of the sortation rates of the order sortation system to eliminate a need for any physical item buffering buffer and communicatively coupled to at least one of the item storage and retrieval system or the order sortation system to at least partially control operation thereof to adjust the current retrieval rate of the item storage and retrieval system and the current sortation rate of the order sortation system, wherein the control system is implemented in a cloud-based virtual server, and provides an item storage and retrieval micro-service, an order sortation or collation micro-service, and a warehouse management micro-service each accessible via an application programming interface gateway.

27. The fulfillment system of claim 26 wherein the control system synchronizes the current retrieval rate or a future retrieval rate of the item storage and retrieval system with the current sortation rate or a future sortation rate of the order sortation system, respectively.

* * * * *